United States Patent
Barclay

(10) Patent No.: US 7,796,676 B2
(45) Date of Patent: *Sep. 14, 2010

(54) SIGNALLING SYSTEM

(75) Inventor: Michael John Barclay, Harston (GB)

(73) Assignee: Intrasonics Limited, Cambridge (GB)

( * ) Notice: Subject to any disclaimer, the term of this patent is extended or adjusted under 35 U.S.C. 154(b) by 1551 days.

This patent is subject to a terminal disclaimer.

(21) Appl. No.: 10/970,332

(22) Filed: Oct. 21, 2004

(65) Prior Publication Data

US 2005/0053122 A1 Mar. 10, 2005

Related U.S. Application Data

(63) Continuation of application No. 09/341,748, filed as application No. PCT/GB98/00151 on Jan. 16, 1998, now Pat. No. 6,850,555.

(30) Foreign Application Priority Data

Jan. 16, 1997 (GB) .................................. 9700854.4

(51) Int. Cl.
*H04B 1/00* (2006.01)
(52) U.S. Cl. ...................... 375/141; 340/446; 367/132; 375/130; 375/146; 455/67.12
(58) Field of Classification Search ................ 367/134, 367/132; 375/130, 141; 380/37; 704/200.1
See application file for complete search history.

(56) References Cited

U.S. PATENT DOCUMENTS 2,660,662 A    11/1953  Scherbatskoy
3,651,471 A    3/1972   Haselwood et al.
3,732,536 A *  5/1973   Larka et al. .................. 367/135
3,742,463 A    6/1973   Haselwood et al.
3,845,391 A    10/1974  Crosby
4,025,851 A    5/1977   Haselwood et al.

(Continued)

FOREIGN PATENT DOCUMENTS

CA        2 073 387 A1    1/1993

(Continued)

OTHER PUBLICATIONS

Neubauer et al., "Continuous Steganographic Data Transmission Using Uncompressed Audio", David Aucsmith (Ed.): Information Hiding (1998), *LNCS* 1525, pp. 208-217.

(Continued)

*Primary Examiner*—David C Payne
*Assistant Examiner*—Adolf Dsouza
(74) *Attorney, Agent, or Firm*—Alston & Bird LLP

(57) ABSTRACT

A signalling system is provided which can be used to update the prices of goods which are electronically displayed on supermarket shelves. The signaling system may include a first signalling device having an input terminal for receiving electrical message data received from a central computer system, a spread spectrum encoder for encoding the received message data and an electroacoustic converter for converting the encoded data into corresponding acoustic signals and for transmitting the acoustic signals from the transmission medium and for converting the received acoustic signals into corresponding electrical signals, a spread spectrum decoder for decoding the received signals and a message regenerator for regenerating the message data transmitted by the first signalling device from the signals output by the decoder.

31 Claims, 7 Drawing Sheets

U.S. PATENT DOCUMENTS

| | | | |
|---|---|---|---|
| 4,127,817 A * | 11/1978 | Bell, Jr. ................... | 455/67.12 |
| 4,237,449 A | 12/1980 | Zibell | |
| 4,425,642 A | 1/1984 | Moses et al. | |
| 4,514,725 A | 4/1985 | Bristley | |
| 4,642,685 A | 2/1987 | Roberts et al. | |
| 4,718,106 A | 1/1988 | Weinblatt | |
| 4,750,034 A | 6/1988 | Lem | |
| 4,807,031 A | 2/1989 | Broughton et al. | |
| 4,840,602 A | 6/1989 | Rose | |
| 4,846,693 A | 7/1989 | Baer | |
| 4,923,428 A | 5/1990 | Curran | |
| 4,945,412 A | 7/1990 | Kramer | |
| 5,085,610 A | 2/1992 | Engel et al. | |
| 5,090,936 A | 2/1992 | Satoh et al. | |
| 5,108,341 A | 4/1992 | DeSmet | |
| 5,113,437 A | 5/1992 | Best et al. | |
| 5,136,613 A | 8/1992 | Dumestre, III | |
| 5,191,615 A | 3/1993 | Aldava et al. | |
| 5,301,167 A * | 4/1994 | Proakis et al. ............. | 367/134 |
| 5,305,348 A * | 4/1994 | Izumi ........................ | 375/141 |
| 5,314,336 A | 5/1994 | Diamond et al. | |
| 5,319,735 A | 6/1994 | Preuss et al. | |
| 5,353,352 A * | 10/1994 | Dent et al. ................... | 380/37 |
| 5,412,620 A | 5/1995 | Cafarella et al. | |
| 5,436,941 A * | 7/1995 | Dixon et al. ................ | 375/146 |
| 5,442,343 A | 8/1995 | Cato et al. | |
| 5,446,756 A * | 8/1995 | Mallinckrodt ............... | 375/130 |
| 5,450,490 A | 9/1995 | Jensen et al. | |
| 5,479,442 A | 12/1995 | Yamamoto | |
| 5,499,265 A | 3/1996 | Dixon et al. | |
| 5,519,779 A | 5/1996 | Proctor et al. | |
| 5,539,705 A * | 7/1996 | Akerman et al. ............ | 367/132 |
| 5,555,258 A | 9/1996 | Snelling et al. | |
| 5,574,773 A | 11/1996 | Grob et al. | |
| 5,579,124 A | 11/1996 | Aijala et al. | |
| 5,604,767 A | 2/1997 | Dixon et al. | |
| 5,623,577 A * | 4/1997 | Fielder ..................... | 704/200.1 |
| 5,657,379 A | 8/1997 | Honda et al. | |
| 5,663,766 A | 9/1997 | Sizer, II | |
| 5,687,191 A | 11/1997 | Lee et al. | |
| 5,719,937 A | 2/1998 | Warren et al. | |
| 5,734,639 A | 3/1998 | Bustamante et al. | |
| 5,752,880 A | 5/1998 | Gabai et al. | |
| 5,774,452 A | 6/1998 | Wolosewicz | |
| 5,822,360 A | 10/1998 | Lee et al. | |
| 5,828,325 A | 10/1998 | Wolosewicz et al. | |
| 5,848,155 A | 12/1998 | Cox | |
| 5,930,369 A | 7/1999 | Cox et al. | |
| 5,937,000 A | 8/1999 | Lee et al. | |
| 5,945,932 A | 8/1999 | Smith et al. | |
| 5,960,398 A | 9/1999 | Fuchigami et al. | |
| 5,963,909 A | 10/1999 | Warren et al. | |
| 5,978,413 A | 11/1999 | Bender | |
| 5,999,899 A | 12/1999 | Robinson | |
| 6,021,432 A | 2/2000 | Sizer, II et al. | |
| 6,022,273 A | 2/2000 | Gabai et al. | |
| 6,035,177 A | 3/2000 | Moses et al. | |
| 6,061,793 A | 5/2000 | Tewfik et al. | |
| 6,125,172 A | 9/2000 | August et al. | |
| 6,290,566 B1 | 9/2001 | Gabai et al. | |
| 6,298,322 B1 | 10/2001 | Lindemann | |
| 6,309,275 B1 | 10/2001 | Fong et al. | |
| 6,370,666 B1 | 4/2002 | Lou et al. | |
| 6,389,055 B1 | 5/2002 | August et al. | |
| 6,434,253 B1 | 8/2002 | Hayashi et al. | |
| 6,438,117 B1 | 8/2002 | Grilli et al. | |
| 6,442,283 B1 | 8/2002 | Tewfik et al. | |
| 6,584,138 B1 | 6/2003 | Neubauer et al. | |
| 6,636,551 B1 | 10/2003 | Ikeda et al. | |
| 6,650,877 B1 | 11/2003 | Tarbouriech et al. | |
| 6,708,214 B1 | 3/2004 | La Fleur | |
| 6,737,957 B1 | 5/2004 | Petrovic et al. | |
| 6,765,950 B1 | 7/2004 | Nuytkens et al. | |
| 6,773,344 B1 | 8/2004 | Gabai et al. | |
| 6,782,253 B1 | 8/2004 | Shteyn et al. | |
| 6,832,093 B1 | 12/2004 | Ranta | |
| 6,850,555 B1 | 2/2005 | Barclay | |
| 6,876,623 B1 | 4/2005 | Lou et al. | |
| 6,892,175 B1 | 5/2005 | Cheng et al. | |
| 7,031,271 B1 | 4/2006 | LaRosa et al. | |
| 7,158,676 B1 | 1/2007 | Rainsford | |
| 2002/0069263 A1 | 6/2002 | Sears et al. | |
| 2004/0169581 A1 | 9/2004 | Petrovic et al. | |

FOREIGN PATENT DOCUMENTS

| | | |
|---|---|---|
| CA | 2 162 614 A1 | 5/1996 |
| CA | 2 230 071 A1 | 6/1996 |
| DE | 3229405 A1 | 2/1984 |
| EP | 0172095 A1 | 2/1985 |
| EP | 0135192 A2 | 3/1985 |
| EP | 0347401 A3 | 12/1989 |
| EP | 0 688 487 A0 | 5/1994 |
| EP | 0631226 A1 | 12/1994 |
| EP | 0 669 070 | 5/1995 |
| EP | 0766468 A2 | 4/1997 |
| EP | 0 883 939 | 8/1997 |
| EP | 0 872 995 A2 | 10/1998 |
| EP | 0606703 B1 | 12/1998 |
| EP | 1 064 742 | 7/1999 |
| EP | 1 062 560 A1 | 12/2000 |
| FR | 2626731 A1 | 10/1989 |
| GB | 2135536 A | 8/1984 |
| GB | 2192743 A | 1/1988 |
| GB | 2196167 A | 4/1988 |
| GB | 2 256 113 A | 11/1992 |
| GB | 2294619 A | 5/1996 |
| GB | 2 345 779 A | 7/2000 |
| JP | 58-69536 A | 4/1958 |
| JP | 63-147738 U | 9/1963 |
| JP | 58 132834 A | 8/1983 |
| JP | 59-166545 U | 11/1984 |
| JP | 60 176397 A | 9/1985 |
| JP | 63-272134 A | 11/1988 |
| JP | 01 200735 A | 8/1989 |
| JP | 04-092518 | 3/1992 |
| JP | 5252578 A | 9/1993 |
| JP | 05-316598 | 11/1993 |
| JP | 08 088587 A | 4/1996 |
| JP | 10-021259 | 1/1998 |
| JP | 2000-207170 | 7/2000 |
| JP | 2000-236576 | 8/2000 |
| JP | 2000-267952 | 9/2000 |
| JP | 2000-308130 | 11/2000 |
| WO | WO 91/10490 A1 | 7/1991 |
| WO | WO 91/10491 A1 | 7/1991 |
| WO | WO 93/07689 A1 | 4/1993 |
| WO | WO 94/08677 A1 | 4/1994 |
| WO | WO 96/19274 A1 | 6/1996 |
| WO | WO 97/21279 A1 | 6/1997 |
| WO | WO 97/31440 A1 | 8/1997 |
| WO | WO 97/33391 A1 | 9/1997 |
| WO | WO 97/41936 A1 | 11/1997 |
| WO | WO 98/06195 A1 | 2/1998 |
| WO | WO 98/20411 | 5/1998 |
| WO | WO 98/51077 | 11/1998 |
| WO | WO 99/46720 | 9/1999 |
| WO | WO 00/15316 | 3/2000 |
| WO | WO 00/44168 A1 | 7/2000 |
| WO | WO 00/60484 | 10/2000 |
| WO | WO 01/57619 A2 | 8/2001 |

WO    WO 01/75629 A1    10/2001

OTHER PUBLICATIONS

Iwakiri et al., "Digital Watermark Scheme for High Quality Audio Data by Spectrum Spreading and Modified Discrete Cosine Transform", *Information Processing Society of Japan* vol. 39 No. 9, pp. 2631-2637 (1998).

Chung et al., "Digital Watermarking for Copyright Protection of MPEG2 Compressed Video", *IEEE Transactions on Consumer Electronics*, vol. 44 No. 3 pp. 895-901 (1998).

Cox et al., "A Secure, Robust Watermark for Multimedia", Ross Anderson (Ed.) Information Hiding (1996), *LNCS* 1174 pp. 185-206.

Cox et al., "Secure Spread Spectrum Watermarking for Multimedia", *IEEE Transactions on Image Processing*, vol. 6 No. 12 pp. 1673-1687 (1997).

Sundaram et al., "An Embedded Cryptosystem for Digital Broadcasting", *IEEE Conference on Universal Personal Communications Record*, vol. 2, pp. 401-405 (1997).

Cox et al., "Secure Spread Spectrum Watermarking for Images, Audio and Video", *IEEE Conference on Image Processing*, vol. 3, pp. 243-246 (1996).

Bender et al., "Techniques for Data Hiding", *IBM Systems Journal* vol. 35 Nos. 3&4 (1996).

Cox et al., "A Secure, Imperceptable yet Perceptually Salient, Spread Spectrum Watermark for Multimedia", *Southcon/96* Orange County Convention Center (1996).

Pohlmann, "Fundamentals of Digital Audio", *Principles of Digital Audio*, pp. 47-48, 255-256 and 323 (1989).

Swanson et al., "Robust Audio Watermarking Using Perceptual Masking". Elsevier Signal Processing, vol. 66, No. 3, May 1998, pp. 337-355.

Seok et al., "Prediction-Based Audio Watermark Detection Algorithm", 109th AES Convention, Sep. 22-25, 2000.

*Simultaneous Subliminal Signalling in Conventional Sound Circuits: A Feasibility Study*, BBC and the ITA, Research Department Report No. 1971/1, Jan. 1971, pp. 1-12.

Bender, W. et al., Techniques for Data Hiding, SPIE vol. 2420, pp. 164-173.

Neubauer et al., *Continuous Steganographic Data Transmission Using Uncompressed Audio*, David Aucsmith (Ed.): Information Hiding (1998), LNCS 1525, pp. 208-217.

Iwakiri et al., *Digital Watermark Scheme for High Quality Audio Data for Spectrum Spreading and Modified Discrete Cosine Transform*, Information processing Society of Japan, vol. 39, No. 9, pp. 2631-2637 (1998).

Chung et al., *Digital Watermarking for Copyright Protection of MPEG2 Compressed Video*, IEEE Transactions on Consumer Electronics, vol. 44, No. 3, pp. 895-901 (1998).

Cox et al., *A Secure, Robust Watermark for Multimedia*, Ross Anderson (Ed.) Information Hiding (1996), LNCS 1174 pp. 185-206.

Cox et al., *Secure Spread Spectrum Watermarking for Multimedia*, IEEE Transactions on Image Processing, vol. 6, No. 12, pp. 1673-1687 (1997).

Sundaram et al., *An Embedded Cryptosystem for Digital Broadcasting*, IEEE Conference on Universal Personal Communications Record, vol. 2, pp. 401-405 (1997).

Cox et al., *Secure Spread Spectrum Watermarking for Images, Audio and Video*, IEEE Conference on Image Processing, vol. 3, pp. 243-246 (1996).

Bender et al., *Techniques for Data Hiding*, IBM Systems Journal, vol. 35, Nos. 3&4 (1996).

Cox et al., *A Secure, Imperceptable Yet Perceptually Salient, Spread Spectrum Watermark for Multimedia*, Southcon/96 Orange County Convention Center (1996).

Pohlmann, *Fundamentals of Digital Audio, Principles of Digital Audio*, pp. 47-48, 255-256, and 323 (1989).

* cited by examiner

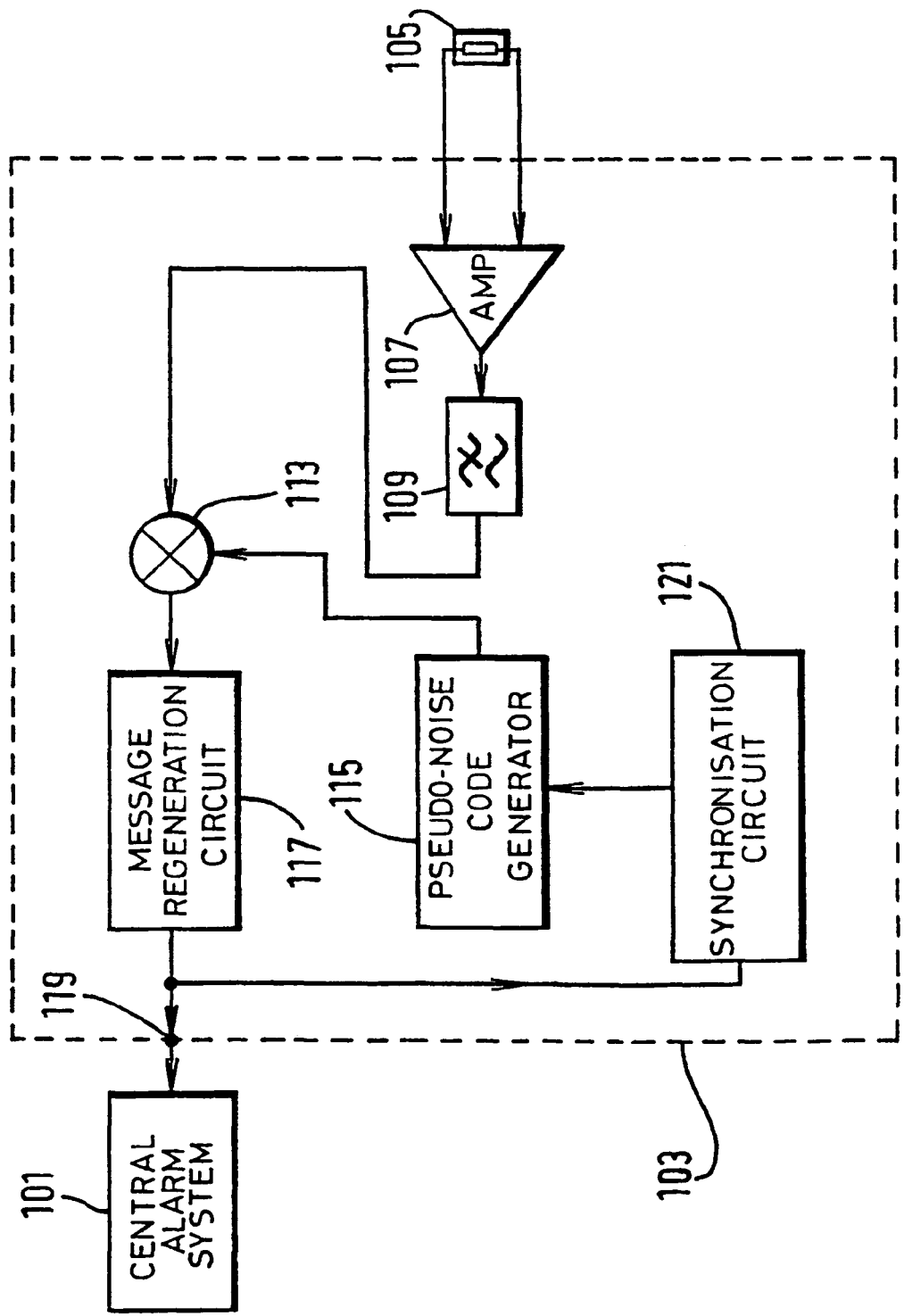

SIGNALLING SYSTEM

CROSS-REFERENCE TO RELATED APPLICATION(S)

This application is a Continuation of U.S. patent application Ser. No. 09/341,748, filed Sep. 28, 1999 now U.S. Pat. No. 6,850,555 which claims priority to International Application PCT/GB98/00151, filed Jan. 16, 1998 and Great Britain Application No. 9700854.4, filed Jan. 16, 1997.

The present invention-relates to an acoustic signalling system. The invention has particular although not exclusive relevance to the communication of data between two devices using acoustic signals.

BACKGROUND OF THE INVENTION

A signalling system has been proposed for use in updating the prices being displayed on supermarket shelves. The system employs a number of LCD displays spaced along the supermarket shelf next to the goods to be sold. Each LCD display is controlled by a respective data tag having a microprocessor which communicates with a central computer system. The communication link between the microprocessor of each tag and the central computer system uses electromagnetic waves to carry the messages.

There are a number of problems with using electromagnetic waves as the medium for sending messages between the microprocessor and the tags. The most significant problem is that the use of electromagnetic waves in many frequency bands is restricted, leaving only high frequency bands for applications such as this. As a result, each of the tags much include a high frequency demodulator if it is to be able to receive transmitted messages from the central communication link. Additionally, if each tag is to be able to transmit messages back to the central computer system, then it will also require a high frequency modulation circuit. The requirement of having to use a demodulation circuit on its own or together with a modulation circuit, significantly increases the complexity and hence the cost of each of the tags.

SUMMARY OF THE INVENTION

The present invention aims to provide an alternative signalling system for use in, for example, supermarkets for communicating between a central computer system and the individual shelf tags.

According to one aspect, the present invention provides a signalling system, comprising: a first signalling device having: i) an input terminal for receiving electrical message data having a power spectrum which lies substantially over a first bandwidth; ii) means for spreading the power spectrum of the message data substantially over a second bandwidth which is greater than the first bandwidth; and iii) means for converting the data output by the spreading means into corresponding acoustic signals; and a second signalling device comprising: i) means for receiving acoustic signals and for converting received acoustic signals into corresponding electrical signals; ii) means for despreading the power spectrum of the received signals; and iii) means for regenerating the message data transmitted by the first signalling device from the despread signals output by the despreading means.

Preferably, the power spectrum of the message data is spread using a spread spectrum encoding technique which combines each bit of the message data with a pseudo-random code, since this allows the second signalling device to be able to reconstruct the message data even when the power level of the acoustic signal at the second signalling device is below the power level of the ambient noise (and hence inaudible to humans).

Preferably, the first signalling device also comprises monitoring means for monitoring the ambient noise level and level adjust means for adjusting the level of the transmitted acoustic signals in dependence upon the monitored level of the ambient noise. This allows the first signalling device to be able to ensure successful transmission to the second signalling device, whilst maintaining system efficiency. Instead of or in addition to varying the level of acoustic signals transmitted, the amount of pseudo-random coding can be varied to ensure successful transmission.

Preferably, the second signalling device is also capable of transmitting message data back to the first signalling device since this allows the second signalling device to be able to, for example, acknowledge receipt of a message sent from the first signalling device. Preferably still, the second signalling device also has means for monitoring the local noise and means for varying its transmission level in dependence upon the monitored noise level. Additionally, this allows both ends of the communication link to monitor the ambient noise and to adjust their own or the other ends transmission level and/or coding accordingly. Alternatively, the transmission level and/or coding can be changed by monitoring some other parameter of the received signal, such as the bit error rate.

The signalling system can be used in many applications, such as for updating the displayed prices of goods on supermarket shelves, for communicating between window/door monitoring devices and a central alarm system and for communicating data between a computer input device, such as a keyboard and/or a mouse and the computer system.

BRIEF DESCRIPTION OF THE DRAWINGS

The present invention will now be described by way of example only, with reference to the following drawings in which:

FIG. 8 schematically shows the central alarm system having a receiver circuit for receiving messages transmitted from the tag shown in FIG. 7.

DETAILED DESCRIPTION OF THE DRAWINGS

Figure 1:
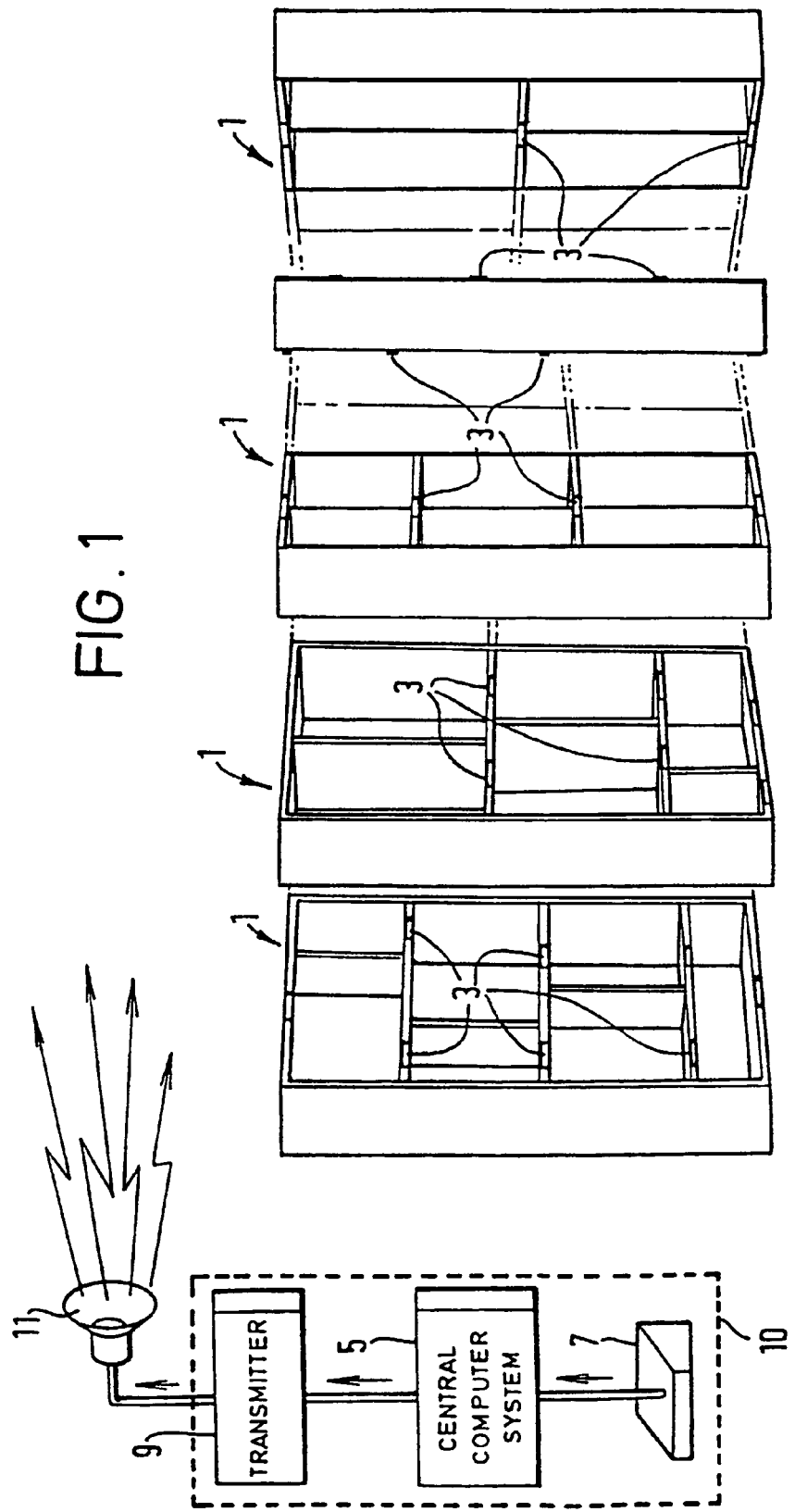
FIG. 1 schematically shows a signalling system for communicating information between a central computer system and a plurality of independent data tags.

A first embodiment of the signalling system of the present invention will now be described with reference to FIGS. 1 to 4. FIG. 1 shows a number of supermarket shelves 1 each having a plurality of tags, some of which are designated 3.

Each tag 3 controls a respective LCD display (not shown) for indicating the price of goods located next to the display. FIG. 1 also shows a central computer system 5 which receives operator commands via keyboard 7 and which communicates updated prices to the respective tags 3 via the transmitter 9 and the loudspeaker 11. In this embodiment, the central computer system 5, the keyboard 7 and the transmitter 9 are located in a control room 10, such as in the supermarket manager's office.

In operation, an operator makes manual changes, via keyboard 7, to the prices stored in the central computer system 5 and then instructs the central computer system 5 to update the appropriate prices on the supermarket shelves 1. To do this, the central computer system sends appropriate data to the transmitter 9 for transmission to the respective tags 3. The data to be transmitted to the tags 3 is encoded and transmitted as an acoustic signal from the loudspeaker 11. In this embodiment, the loudspeaker forms part of the supermarket tannoy system (not shown). In this embodiment, each tag 3 has its own identification code or address, so that messages from the central computer system 5 can be directed to a specific tag in order that each display is updated with the correct pricing information.

In this embodiment, the transmitter uses a spread spectrum encoding technique which spreads the power of the message to be transmitted over a wider band of frequencies. The advantage of using a spread spectrum encoding technique is that even if the noise level is well above that of the received signal, the tags can still reconstruct the transmitted message. Therefore, it is possible to arrange for the transmitter 9 to output acoustic signals so as to create a zone in which the power level of the transmitted acoustic signals is below that of the ambient noise (and hence inaudible to shoppers in that zone) whilst still being high enough to ensure that tags located within the zone can reconstruct the transmitted message.

Figure 2:
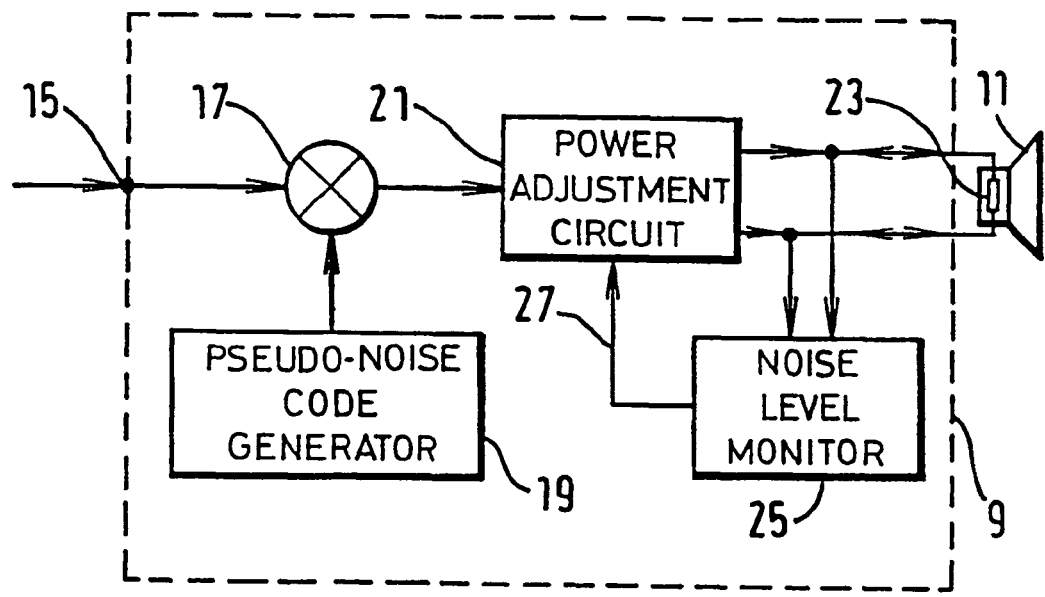
FIG. 2 schematically shows in more detail, the transmitter circuit shown in FIG. 1.

FIG. 2 is a schematic block diagram showing the constituent parts of the transmitter 9. As shown, the transmitter 9 receives, at input terminal 15, a binary message from the central computer system 5 for transmission to a tag 3. As mentioned above, the transmitter 9 employs a spread spectrum encoding technique which spreads the power spectrum of the binary message over a wider band of frequencies, by combining the binary message with a pseudo-noise binary code generated by the pseudo-noise code generator 19. In particular, in place of each bit of the binary message, the transmitter 9 transmits a pseudo-noise binary code or the inverse of the pseudo-noise binary code, depending on whether the message bit is a 1 or a 0. In this embodiment, this is achieved by representing a binary 1 as +1 and a binary 0 as −1, eg +1 volt and −1 volt, for both the message bits and the pseudo-noise code bits and then multiplying the message bits by the pseudo-noise code bits in mixer 17. The resulting binary voltage signal output by the mixer 17 is then amplified by the power adjustment circuit 21 and applied directly to loud speaker 11, without modulating the signal onto a carrier signal. Consequently, in this embodiment, the electrical signal applied to the loud speaker 11 is a square wave voltage which varies between a positive voltage and a negative voltage. In other implementations a square wave voltage which varies between two positive voltages could be used. Additionally, depending on the type of electroacoustic transducer which is employed by the loud speaker 11, a current could be used as the driving signal.

As those skilled in the art of telecommunications will appreciate, pseudo-noise codes are binary codes which appear to be completely random in nature, but which are in fact deterministic, i.e. they can be reproduced. In particular, these codes are generated by exclusive-or feedback from synchronously clocked registers. By continually clocking the registers, the pseudo-noise code is cyclically reproduced and can therefore be readily combined with the binary message. The number of registers, the registers used in the feedback path and the initialisation state of the registers determines the length of code and the specific code produced.

The length of code used is a design choice which depends on many factors, but should not be too short that the system is unable to isolate a transmitted signal from electrical interference and the code should not be too long that the system clock rate becomes prohibitively large. As those skilled in the art will appreciate, the length of code used will also dictate the size of the above described zone. In particular, with a long code the tags will be able to reconstruct the transmitted message with very low levels of signal to noise ratio, resulting in a large zone, whereas with a short code the tags need higher levels of signal to noise ratio to be able to reconstruct the transmitted message, resulting in a smaller zone. However, with a long code the tags will have to operate at a higher clock rate than they would with a short code. As those skilled in the art will appreciate, once the length of code has been chosen, it is possible to determine the minimum power level of the acoustic signal output by the loudspeaker 11 which will result in the necessary levels of signal to noise ratio at the most distant tag to achieve successful transmission, for a given ambient noise power level and transmission medium (which in this embodiment is air).

In this embodiment, to transmit the necessary pricing information from the central computer system 5 to each tag 3, a bit rate of a few tens of bits per second is required resulting in the majority of the power within the binary message being spread over a bandwidth of approximately 100 Hz. In this embodiment, a 127 bit pseudo-noise code is used which results in the majority of the power of the transmitted signal being spread over a bandwidth of approximately 10 KHz. With a code of this length, the tags can reconstruct the message provided the received signal to noise ratio is greater than approximately −15 dB. In this embodiment, the distance between the loudspeaker 11 and the most distant tag is below 10 meters, which means that the power level of the acoustic signals output by the loudspeaker 11 can also be below that of the ambient noise. However, this is not essential. The loudspeaker 11 could be some distance away (greater than 50 meters). In which case, the power levels of the transmitted acoustic signals at the loudspeaker 11 might need to be above the ambient noise level (and hence would be audible at the speaker) to achieve successful transmission.

Figure 3:
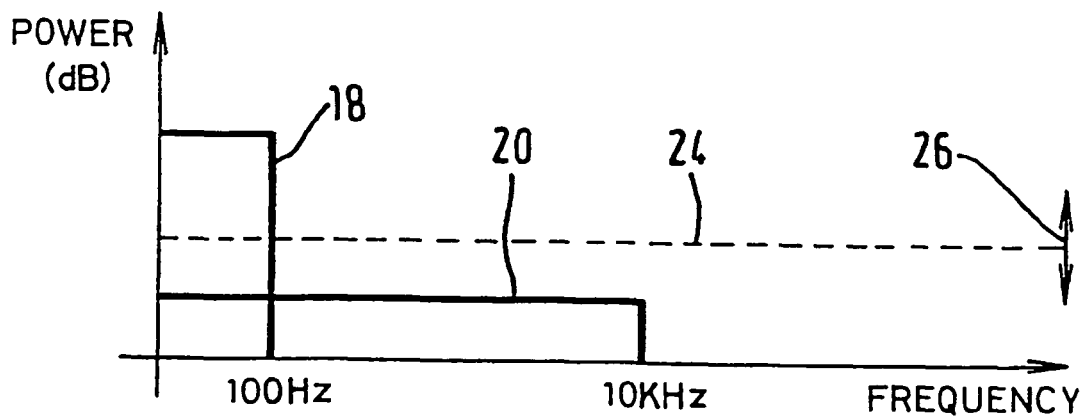
FIG. 3 is a plot of the power spectrum of the data to be sent, of the transmitted signal and of the ambient noise.

FIG. 3 shows a plot of the power spectrum 18 of the binary message to be transmitted, the power spectrum 20 of the transmitted acoustic signal at the loudspeaker 11 and the ambient noise power spectrum 24 which, as represented by arrow 26, changes with time. As shown, in this embodiment, since a relatively long pseudo-noise code is used and since the distance between the loudspeaker and the tags 3 is relatively small (below 10 meters), the power level of the transmitted acoustic signal at the loudspeaker 11 is also below the ambient noise level. Since the ambient noise power level changes with time, however, the power level of the signal to be transmitted is also varied with time by the power adjustment circuit 21 in dependence upon the ambient noise power level (determined by the noise level monitor 25), to ensure that the necessary level of signal to noise ratio is present at the most distant tag whilst ensuring that the transmitter is operating reasonably efficiently. In this embodiment, the loudspeaker 11 employs a reversible electroacoustic transducer 23 which converts electrical voltage signals into corresponding acoustic signals and vice-a-versa, and the noise level monitor 25 determines the level of the background noise by processing the signals produced by the electroacoustic transducer 23 when the transmitter 9 is not transmitting signals. In this embodiment, the electroacoustic transducer 23 comprises a piezoelectric element which converts an applied voltage signal into a corresponding acoustic signal.

Figure 4:
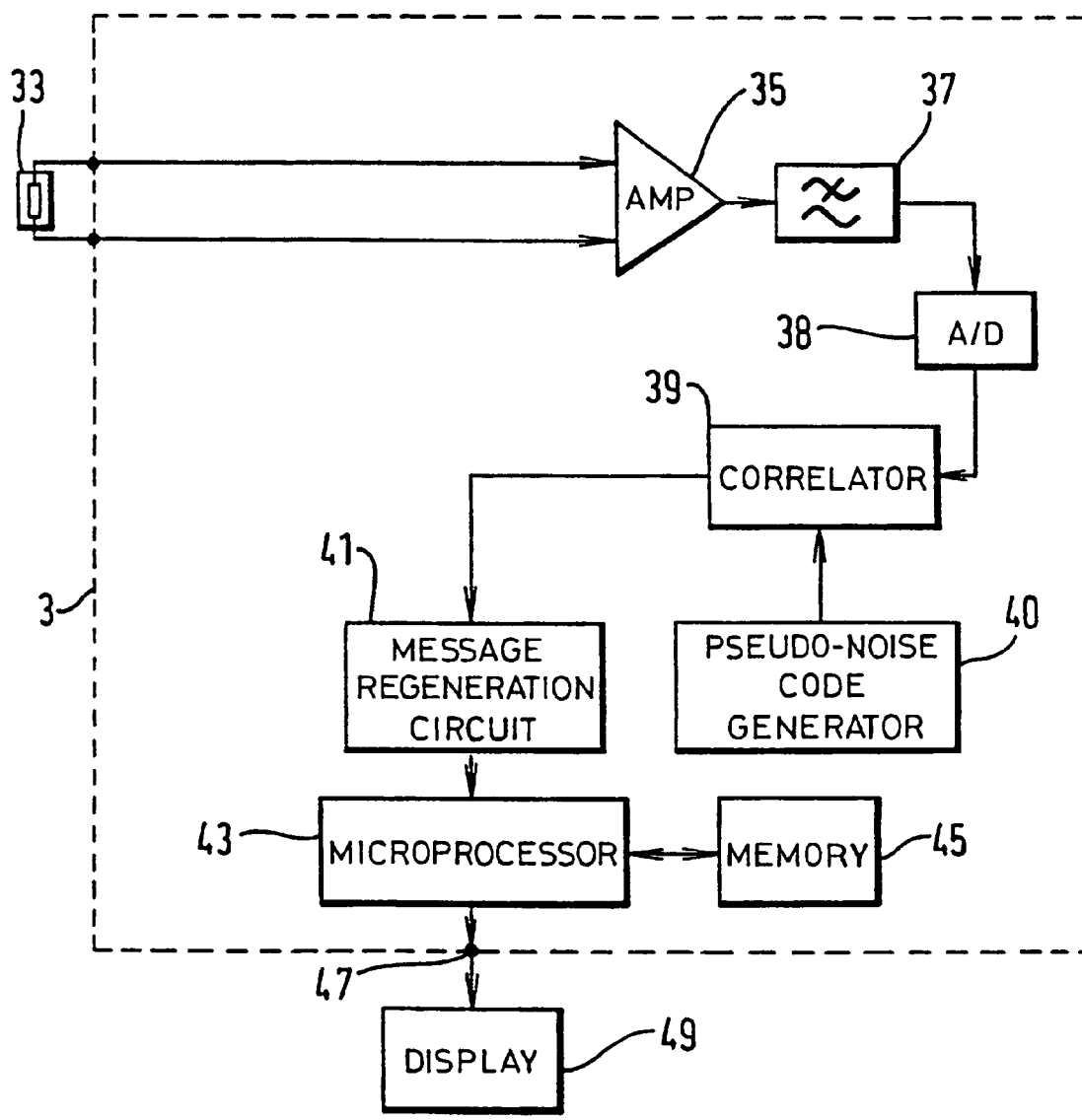
FIG. 4 shows in more detail one of the tags shown in FIG. 1.

FIG. 4 schematically shows the main components of each tag 3. As shown, each tag 3 is connected to an electroacoustic transducer 33 which converts received acoustic waves into corresponding analogue electrical signals which are amplified by amplifier 35 and filtered to remove high frequency components by filter 37. The filtered signals are then converted into digital signals by analogue to digital converter 38 and passed through a correlator 39. The correlator 39 correlates the incoming signals with the same pseudo-noise binary code used to spread the spectrum of the binary message in the transmitter 9. As shown, the pseudo-noise code is generated by the pseudo-noise code generator 40. Since the pseudo-noise binary code appears to be random, and therefore has a wide bandwidth, the auto correlation function of the pseudo-random binary code has a relatively sharp peak. Consequently, the correlator unit 39 outputs positive and negative peaks when there is a match between the pseudo-noise code and the received signal. In particular, a positive peak is generated when the received signal matches the stored pseudo-noise code and a negative peak is generated when the received signal matches the inverse of the stored pseudo-noise code. The peaks output from the correlator 39 are then fed to a message regeneration circuit 41 which converts the peaks into corresponding binary signals and sends them to the microprocessor 43.

The microprocessor 43 receives the incoming binary message and determines whether or not it is directed to it by comparing an address in a header portion of the binary message with its address stored in memory 45. When the received message is directed to that tag 3, the microprocessor 43 processes the received message and outputs an actuation signal to output terminal 47 for altering the price currently being displayed on display 49.

As those skilled in the art will appreciate, apart from the advantage of being able to transmit acoustic signals so that they are inaudible to shoppers in the vicinity of the tags 3, the signalling system described above, has the advantage that each of the tags 3 does not require demodulation circuitry to be able to reconstruct the transmitted message since the transmitted message is a baseband signal. Consequently, each of the tags 3 can be made relatively cheaply as compared with similar tags for use in a signalling system which employs electromagnetic waves as the message carrier.

A number of alternative embodiments which operate in a similar manner to the first embodiment will now be described. The description of these alternative embodiments will be restricted to features which are not in the first embodiment.

In the first embodiment, messages are only sent from the central computer system 5 to the individual tags 3. In a second embodiment which will now be described with reference to FIGS. 5 and 6, the tags 3 are also able to transmit messages back to the central computer system 5. As those skilled in the art will appreciate, if the shoppers are not to hear the acoustic signals transmitted from the tags 3, then a relatively long code will be required and the loudspeaker will have to be quite close to the tags, in order to allow the tags to be able to transmit the acoustic signals below the level of the ambient noise. Therefore, in this embodiment the most distant tag is located within ten meters of the loud speaker 11 and a 127 bit pseudo-noise code is used.

Figure 5:
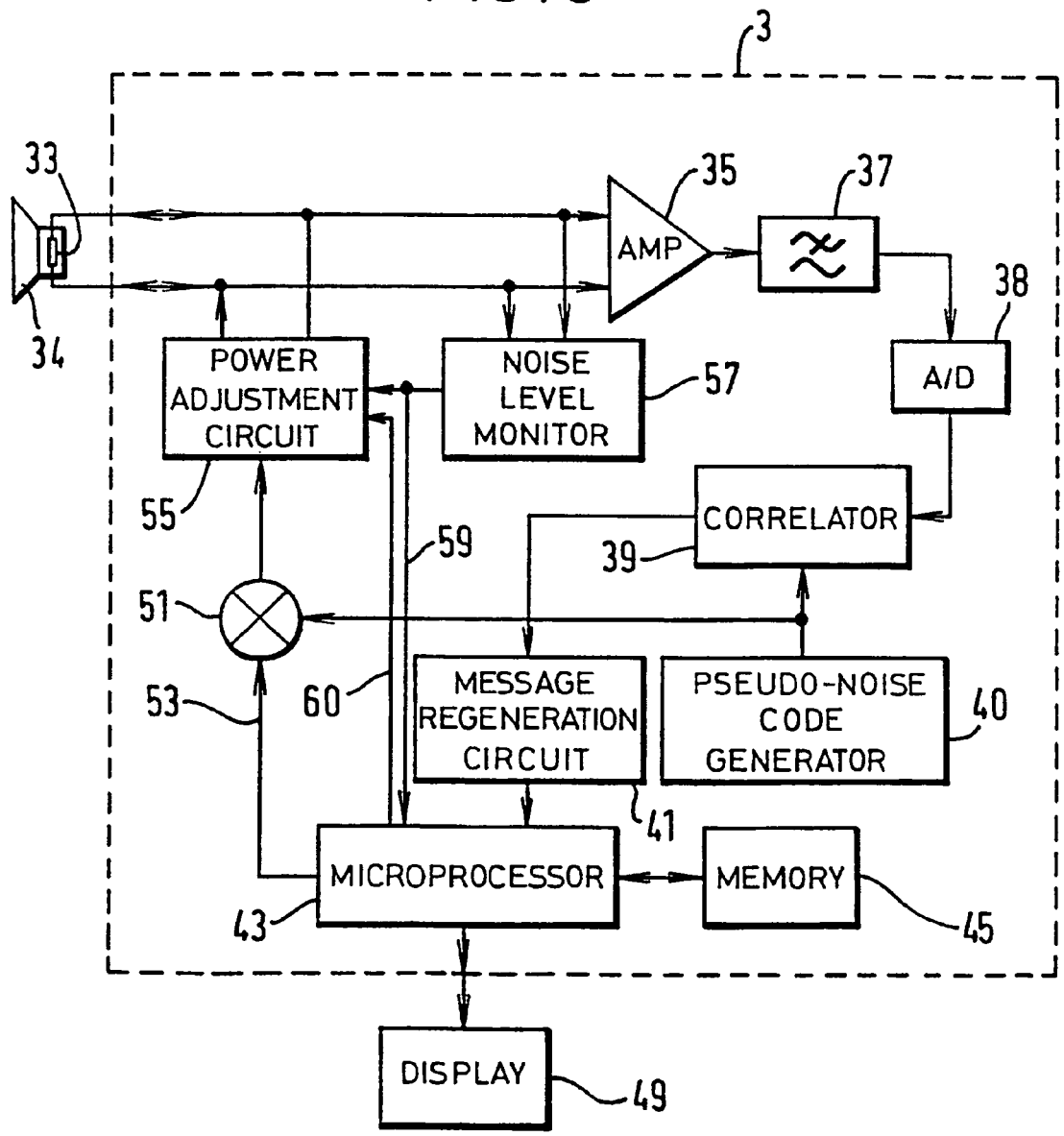
FIG. 5 schematically shows a tag for use in a second embodiment in which the tag can receive data from and transmit data to the central computer system shown in FIG. 1.

FIG. 5 is a schematic diagram showing the components of each tag 3 used in the second embodiment. In this embodiment, the electroacoustic transducer 33 is reversible and forms part of a loudspeaker 34. As shown, the circuitry for receiving acoustic signals from the transducer 33 is identical to that shown in FIG. 4, and will not be described again. In this embodiment, the microprocessor 43 can transmit messages back to the central computer system 5, for example to acknowledge receipt of a received message or to inform the central computer system 5 that there is a fault with the tag 3. The message to be sent back to the central computer system is input to mixer 51 via connector 53, where it is combined with the pseudo noise code generated by the pseudo noise code generator 40. As with the signals transmitted by the transmitter in the first embodiment, the power level of the combined signal output by mixer 51 is adjusted by a power adjustment circuit 55 to ensure that the necessary level of signal to noise ratio is present at the receiver of the central computer system 5 to achieve successful transmission. As in the first embodiment, a noise level monitor 57 is provided for monitoring the local noise level when the tag 3 is not transmitting messages to the central computer system 5, and for controlling the power adjustment circuit 55. In this embodiment, the ambient noise level determined by the noise level monitor 57 is also passed to the microprocessor 43 via connector 59, so that this information can also be transmitted back to the central computer system 5.

Figure 6:
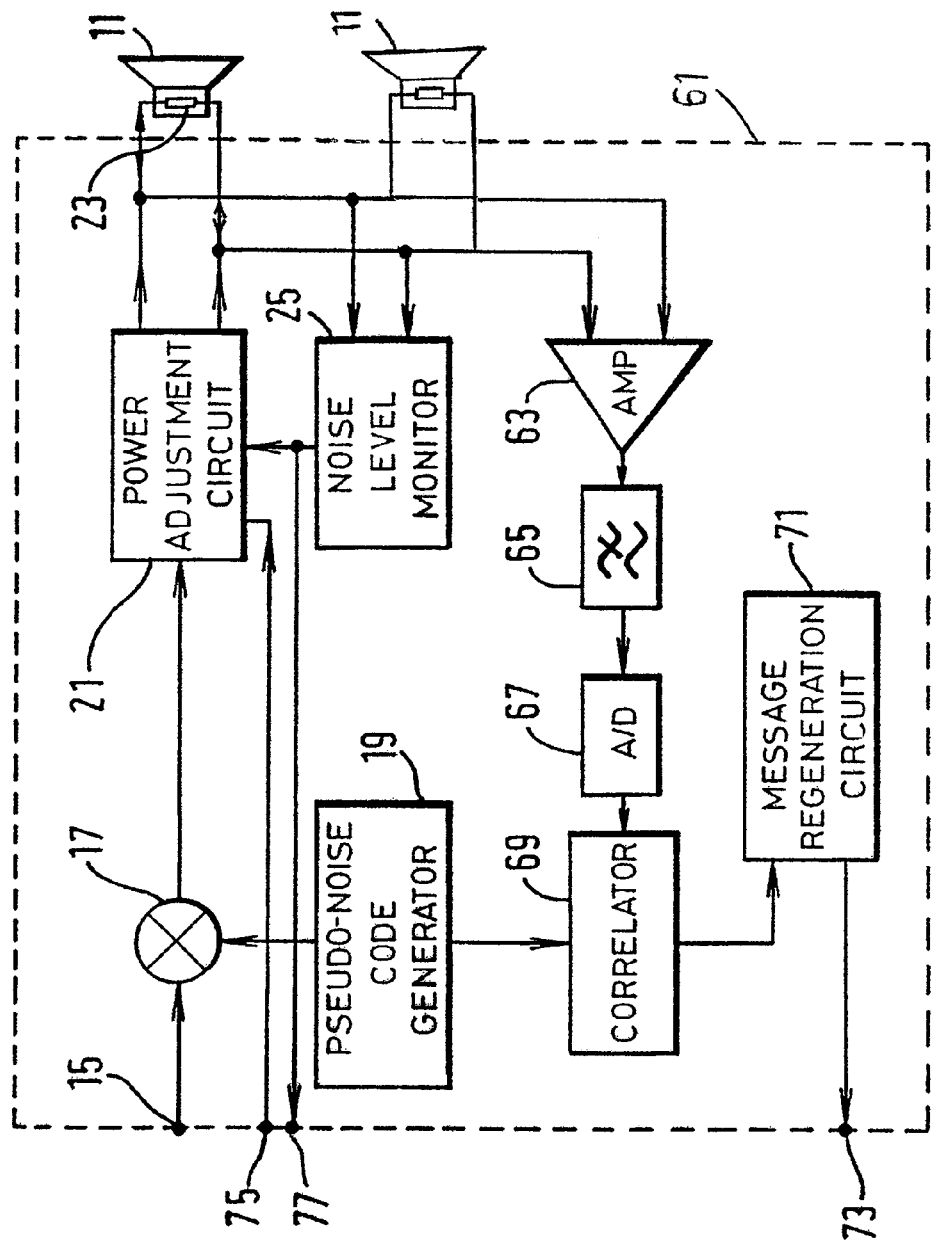
FIG. 6 schematically shows a transmitter and receiver circuit for use in a second embodiment in which the tags can receive data from and transmit data to the central computer system shown in FIG. 1.

FIG. 6 schematically shows a transmitter and receiver circuit 61 which is connected to the central computer system 5 shown in FIG. 1. As shown, the circuitry for the transmitting portion is the same as that shown in FIG. 2 and will not be described again. Acoustic messages which are sent from a tag 3 are received and converted into corresponding analogue electrical signals by the electroacoustic transducer 23 in the loudspeaker 11. The received electrical signals are then amplified by the amplifier 63 and filtered to remove high frequency components by filter 65. The filtered signals are then converted into digital signals by analogue to digital converter 67 and then passed through a correlator 69. The correlator 69 correlates the incoming signals with the same pseudo-noise binary code used to spread the spectrum of the binary message in the tag 3. As shown, the pseudo-noise code is generated by the pseudo-noise code generator 19. The peaks output from the correlator 69 are then fed to a message regeneration circuit 71 which converts the peaks into corresponding binary signals and sends them to output terminal 73 for transmission to the central computer system 5 (shown in FIG. 1) which interprets the received message and takes appropriate action.

As mentioned above, in this embodiment, each tag 3 transmits information back to the central computer system 5 indicative of the local noise level at the tag 3. The central computer system 5 processes this information and can send an appropriate control signal to input terminal 75 of the transmitter and receiver circuit 61 for causing the power adjustment circuit 21 to increase the transmitted signal power level so that a particular tag can successfully receive the transmitted message. The central computer system 5 can also transmit a request back to one or more of the tags 3, requesting them to increase or decrease the power level of the signals which they are transmitting back. To achieve this, as shown in FIG. 5, a connection 60 is provided between the microprocessor 43 and the power adjustment circuit 55 in each tag 3, for allowing the microprocessor 43 to override the control signal generated by the noise level monitor 57, so that the power level of the transmitted signal can be increased or decreased by the desired amount. Additionally, as shown in FIG. 6, the noise level determined by the noise level monitor 25 is passed to the central computer system 5 via output terminal 77, so that the central computer system 5 can transmit a message back to each tag 3 indicative of the ambient noise level at the loud speaker 11, so that the tags can adjust the power level of the acoustic signals which they transmit accordingly.

In the above described second embodiment, the same pseudo-noise code was used to transmit messages from the central computer system to each of the tags and to send messages back from the tags to the central computer system. In an alternative embodiment, a first pseudo-noise code could be used to transmit messages between the central computer system and each of the tags and a second different pseudo-noise code could be used for transmitting messages back from the tags to the central computer system. This would avoid interference of signals which are transmitted from the central computer system and one of the tags at the same time.

In the above embodiments, the level of the acoustic signal transmitted from each tag or from the central computer system is controlled in dependence upon the ambient noise so as to ensure successful transmission. Alternatively, instead of adjusting the level of the acoustic signals, the amount of pseudo random coding could be changed. In particular, when there is difficulty in extracting the transmitted message from the received signal, a longer length code could be used which allows the receiver to operate with lower levels of signal to noise ratios.

In the above described embodiments, one or both ends of the communication link monitor the ambient noise and adjust their own or the other end's transmission level or code in order to ensure successful transmission of data between the tags and the central computer system. Alternatively, the transmission level or coding can be changed in dependence upon another parameter of the received signal, such as the bit error rate.

In the above described embodiments, the ambient noise level is considered to be constant throughout the frequency band of operation. Consequently, the same amplification factor is applied to the signals to be transmitted. In an alternative embodiment, the bandwidth of operation could be split into a number of sub-bands and the noise level monitor circuits could be arranged to determine the average noise level within each frequency sub-band and then the power adjustment circuits could be used to adjust the power level in each sub-band, to ensure maximum data rates in some frequency sub-bands and minimum interference in others. In addition, the power adjustment circuits could also take into consideration the characteristics of human auditory perception, so that the acoustic signal level in the vicinity of the tags is further below the ambient noise level in frequency bands where the human ear is most sensitive and nearer the ambient noise level in frequency bands where the human ear is less sensitive, thereby maximising data rates and transmission efficiency.

In the above described embodiments, each tag is provided with its own unique identification code or address to allow messages transmitted from the central computer system to be directed to a specific tag and to allow the central computer system to be able to distinguish between messages received from different tags. In an alternative embodiment, each tag could be associated with its own unique pseudo-noise code and the transmitter could send a message to a selected tag by using the appropriate code. However, such an embodiment would require the transmitter circuit to be able to generate a large number of different pseudo-noise codes.

In the above embodiments, the message data was encoded using a spread spectrum encoding technique. In an alternative embodiment, the message data may be encoded using another encoding technique in addition to or instead of the spread spectrum encoding technique. For example, block encoding could be used instead of spread spectrum encoding and additional encoding may be provided to allow for error checking and/or to alleviate inter symbol interference caused by the transmission medium. Encoding may also be employed to facilitate synchronisation and/or the regeneration of a clock signal. The types and forms of such encoding techniques are well know to those skilled in the art of telecommunications and will not be described further.

In the above described embodiments, a spread spectrum encoding technique was employed so that the power level of the transmitted acoustic signals could be such that in the vicinity of the tags, the power level of the acoustic signal could be below the ambient noise level so that they are inaudible to shoppers. In an alternative embodiment, the message data could be modulated onto a high frequency carrier signal prior to transmission so that the resulting acoustic signals are in the ultrasound region and therefore also inaudible to humans. Alternatively still, since the prices on the tags are usually only ever changed in the morning prior to opening, the pricing information could be transmitted directly to the tags from the central computer system without encoding. However, this is not a preferred embodiment since the supermarket staff working at that time will be able to hear the transmitted data and may therefore be distracted by it.

In the above described embodiments, a single loudspeaker was shown for transmitting the messages from the central computer system 5 to each of the tags 3. In an alternative embodiment, several loudspeakers could be employed distributed throughout the supermarket. This has the advantage of increasing the area of the above described zone whilst not increasing the length of the pseudo-noise code.

A signalling system has been described for use in a supermarket. The signalling system described has other applications. For example, the signalling system could be used for communicating between a computer terminal and an input device, such as a keyboard or a mouse.

Figure 7:
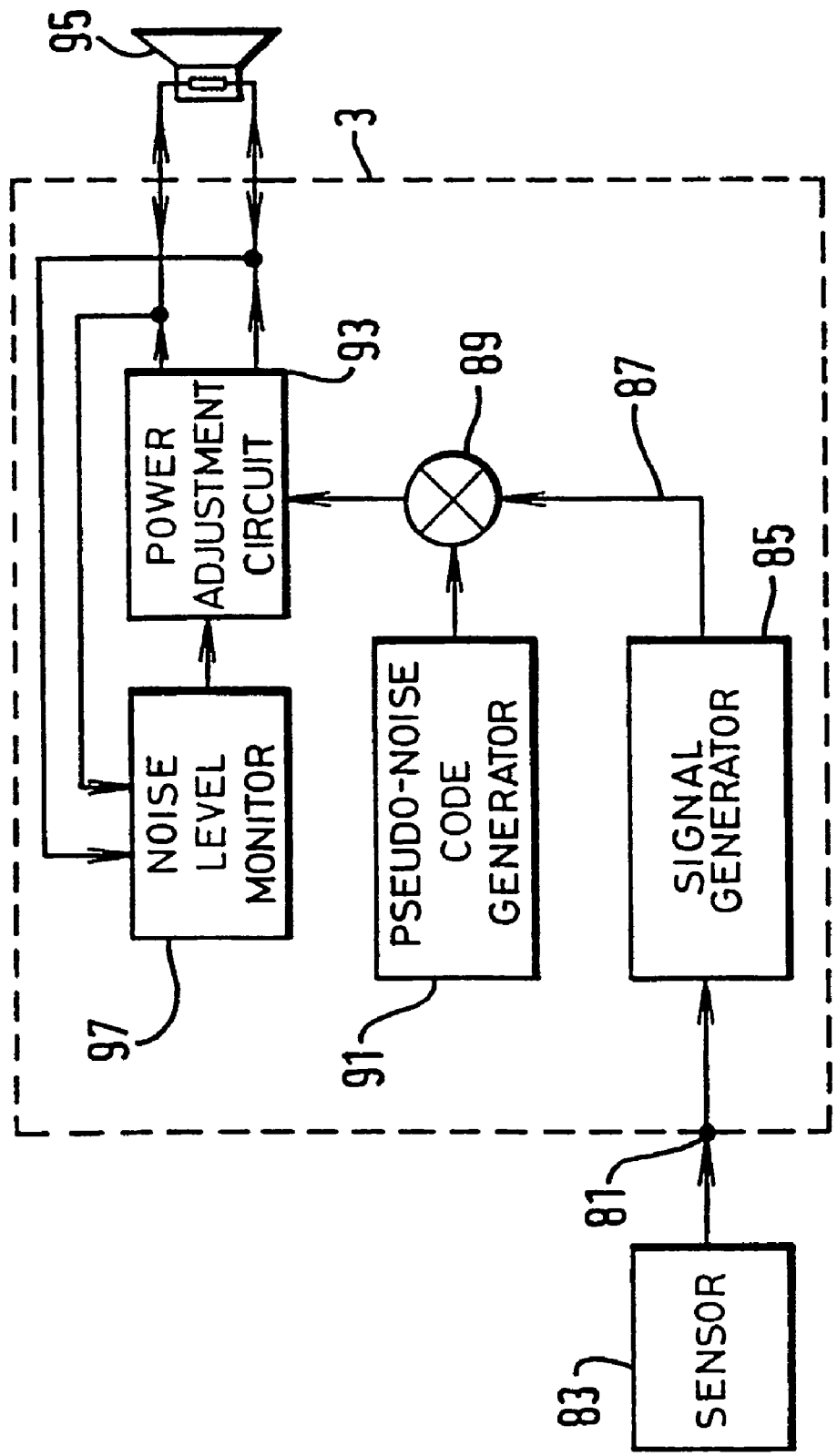
FIG. 7 schematically shows a tag for use in an alarm system for transmitting data back to a central alarm system in dependence upon received sensor data.

The signalling system can also be used in domestic applications in for example an alarm system for transmitting messages between a number of tags which are used for monitoring doors and windows etc. and a central alarm system. In such an application, if a window is broken, then the appropriate tag transmits an acoustic signal back to the central alarm system which activates the alarm and/or informs the police. FIG. 7 is a schematic diagram showing the components of each tag 3 used in such an alarm system. As shown, each tag 3 comprises an input terminal 81 for receiving a signal from a sensor 83 which senses, for example, motion in the vicinity of the sensor 83 or the condition of a door or window (not shown). The sensor signals received at input terminal 81 are passed to a signal generator 85 which processes the sensor signals and generates output message data which is fed via connector 87, to the mixer 89. As in the other embodiments, the mixer 89 is used to combine the message data with a pseudo noise code which is generated by the pseudo noise code generator 91. The power of the combined signal is then adjusted in the power adjustment circuit 93 and then transmitted as an acoustic signal via the loudspeaker 95. As in the other embodiments, a noise level monitor 97 is provided which monitors the local noise level and controls the power adjustment circuit 93 accordingly.

FIG. 8 shows the central alarm system 101 having a receiver circuit 103 for decoding signals transmitted by the tag 3 shown in FIG. 7. As shown, an electroacoustic transducer 105 is provided which converts received acoustic signals into corresponding analogue electric signals which are amplified by amplifier 107 and filtered to remove high frequency components by filter 109. The filtered signals are then passed to the mixer 113 which combines the received signals with the same pseudo noise code (generated by the generator 115) used at the transmitter side. The signal output from the mixer 113 is then fed into the message regeneration circuit 117 which regenerates the message data and outputs it to output terminal 119 for transmission to the central alarm system 101. In this embodiment, the transmitted data is despread using a mixer 113 instead of a correlator, although a correlation despreading technique could of course be used. In order to be able to despread the transmitted data successfully, however, the mixing of the received data with the pseudo noise code generated by the generator 115 must be synchronised, otherwise the output of the mixer will just be noise. For this purpose, a synchronisation circuit 121 is provided which controls the generator 115 in dependence upon a feedback signal output by the message regeneration circuit 117.

In operation, the signal generator 85 monitors the sensor signals received at input terminal 81 and from time to time transmits a status message back to the central alarm system 101. In the event that the sensor 83 detects motion, or detects that the door or window is opened, the signal generator 85 generates an appropriate message which is transmitted back to the central alarm system 101. The central alarm system 101 then takes the appropriate action by, for example, sounding an alarm (not shown). In an alternative embodiment, the central alarm system could transmit a message back to the tag which sent the message instructing it to sound a localised alarm or a verbal warning.

As those skilled in the art will appreciate, the above described modifications which were made to the first embodiment can also be made to this alarm embodiment.

In the above described embodiments, the acoustic signals were transmitted through air. The signalling system of the above embodiments could also be used in applications where the transmission medium is not air and is, for example, water.

In the above described embodiments, a central computer system or a central alarm system was provided. In an alternative embodiment, each of the tags could communicate directly with each other, with no tag taking overall control.

The present invention is not intended to be limited to the above described embodiments. Other modifications and embodiments will be apparent to those skilled in the art.

The invention claimed is:

1. An acoustic data communication system comprising:
a first acoustic data communications device comprising: (i) an input terminal operable to receive electrical message data having a power spectrum which lies substantially over a first bandwidth, (ii) a spread spectrum encoder operable to spread the power spectrum of the message data substantially over a second bandwidth which is greater than the first bandwidth and which extends over a frequency band which is audible to humans; and (iii) an electroacoustic convertor operable to convert the data output by said spread spectrum encoder into corresponding acoustic signals having a bandwidth that extends over a frequency band audible to humans and for transmitting the acoustic signals into the atmosphere; and
a second acoustic data communications device comprising: (i) an acoustoelectric converter operable to receive acoustic signals from the atmosphere and to convert the received acoustic signals into corresponding electrical signals; (ii) a spread spectrum decoder operable to despread the power spectrum of the received signals; (iii) a message regenerator operable to regenerate the message data transmitted by said first acoustic data communications device from the despread signals output by said spread spectrum decoder; (iv) a processor operable to process the regenerated message data and operable to output a control signal in dependence upon the regenerated message data and (v) an output coupled to the processor and operable to receive the control signal and to output a human discernable response in dependence upon the control signal.

2. A system according to claim 1, wherein said output comprises a display for outputting a visible response in dependence upon the control signal.

3. A system according to claim 1, wherein said output comprises a loudspeaker for outputting an audible response in dependence upon the control signal.

4. A system according to claim 1, wherein said spread spectrum encoder is operable to combine the bits of the message data with a pseudo-noise code.

5. A system according to claim 4, wherein said spread spectrum encoder is operable to replace each bit of the message data with a pseudo-noise code or an inverse of the pseudo-noise code in dependence upon whether the message bit is a one or a zero.

6. A system according to claim 5, wherein the message bits are represented as plus one or minus one, and wherein said spread spectrum encoder comprises a code generator for generating said pseudo-noise code and a mixer for multiplying the code generated by said code generator with said message bits.

7. A system according to claim 4, wherein said spread spectrum decoder is operable to combine the received signal with the same pseudo-noise code used in the spread spectrum encoder.

8. A system according to claim 7, wherein said spread spectrum decoder is operable to multiply the received signal with said pseudo-noise code.

9. A system according to claim 8, wherein said spread spectrum decoder is operable to correlate the received signal with said pseudo-noise code.

10. A system according to claim 1, wherein said first acoustic data communications device further comprises a power monitor operable to monitor the power level of the ambient noise and an adjuster operable to adjust the power level of the transmitted acoustic signals in dependence upon the monitored power level of the ambient noise.

11. A system according to claim 10, wherein said monitor is operable to monitor the noise in a number of frequency sub-bands extending over said second bandwidth, and wherein said adjuster is operable to adjust the power level of the transmitted acoustic signals independently in each of said frequency sub-bands.

12. A system according to claim 11, wherein said adjuster is operable to adjust the power level in each sub-band in dependence upon the sensitivity of the human ear to acoustic signals in that sub-band.

13. A system according to claim 10, wherein said spread spectrum encoder is operable to combine the bits of the message data with a pseudo-noise code and wherein said adjuster is operable to adjust said power level of the transmitted acoustic signals in dependence upon the length of code used by said spread spectrum encoder and upon the distance between the first and second acoustic data communications devices.

14. A system according to claim 13, wherein said adjuster is operable to adjust the power level of the transmitted acoustic signal so that the power level of the transmitted acoustic signal at the second acoustic data communications device is below the power level of the ambient noise.

15. A system according to claim 1, wherein said second acoustic data communications device further comprises: i) a signal generator for generating message data having a power spectrum which lies substantially over a first bandwidth; ii) a power spreader operable to spread the power spectrum of the message data substantially over a second bandwidth which is greater than the first bandwidth and which extends over a frequency band which is audible to humans; and iii) a converter operable to convert the data output by said spreader into corresponding acoustic signals and operable to transmit the acoustic signals into the atmosphere; and wherein said first acoustic data communications device further comprises: i) a receiver operable to receive acoustic signals from the atmosphere and to convert the received acoustic signals into corresponding electrical signals; ii) a power despreader operable to despread the power spectrum of the received signals; and iii) a message regenerator operable to regenerate the message data transmitted by the second acoustic data communications device from the despread signals output by the despreader.

16. A system according to claim 15, wherein the spreader of the second acoustic data communications device is operable to spread the message data using a pseudo-noise code which is different from a pseudo-noise code used to spread the message signal by the spread spectrum encoder of the first acoustic data communications device.

17. A system according to claim 15, wherein the second acoustic data communications device further comprises a monitor operable to monitor the power level of the ambient noise at the second acoustic data communications device and an adjuster operable to adjust the power level of the acoustic signals transmitted by said second acoustic data communications device in dependence upon the monitored power level of the ambient noise at the second acoustic data communications device.

18. A system according to claim 17, wherein at least one of said first and second acoustic data communications devices is operable to transmit message data indicative of the power level of the ambient noise monitored at that acoustic data communications device to the other acoustic data communications device for use in controlling the power level of the acoustic signal transmitted by the other acoustic data communications device.

19. A system according to claim 17, wherein said first acoustic data communications device further comprises a power monitor operable to monitor the power level of the ambient noise and an adjuster operable to adjust the power level of the transmitted acoustic signals in dependence upon the monitored power level of the ambient noise and wherein the adjuster of at least one of said acoustic data communications devices is operable to control the power level of the acoustic signals transmitted by that acoustic data communications device in dependence upon the message data received from the other acoustic data communications device.

20. A system according to claim 17, wherein said first acoustic data communications device further comprises a power monitor operable to monitor the power level of the ambient noise and an adjuster operable to adjust the power level of the transmitted acoustic signals in dependence upon the monitored power level of the ambient noise and wherein the adjuster of at least one of said first and second acoustic data communications devices is operable to adjust the power level of the acoustic signals transmitted by that acoustic data communications device in dependence upon the bit error rate of the message data received from the other acoustic data communications device.

21. A system according to claim 1, wherein said first acoustic data communications device comprises a signal generator operable to generate said message data.

22. A system according to claim 21, wherein said signal generator of said first acoustic data communications device is operable to generate said message data in dependence upon sensor data received from a sensor.

23. A system according to claim 21, wherein said signal generator of said first acoustic data communications device is operable to generate said message data in dependence upon user input.

24. A system according to claim 1, comprising a plurality of said second acoustic data communications devices, each operable to receive message data transmitted by said first acoustic data communications device.

25. A system according to claim 24, wherein said first acoustic data communications device is operable to transmit message data to a selected one or more of said second acoustic data communications devices.

26. A system according to claim 25, wherein each of said second acoustic data communications devices is independently addressable.

27. A system according to claim 1, comprising a plurality of said first acoustic data communications devices, each operable to transmit message data to the second acoustic data communications device.

28. A system according to claim 1, wherein said electroacoustic converter comprises one or more spaced loudspeakers.

29. An atmospheric acoustic data communication method comprising:

receiving electrical message data having a power spectrum which lies substantially over a first bandwidth at a first acoustic data communications device;

spreading the power spectrum of the message data substantially over a second bandwidth which is greater than the first bandwidth and which extends over a frequency band which is audible to humans at the first acoustic data communications device;

converting the data generated by said spreading step into corresponding acoustic signals having a bandwidth that extends over a frequency band audible to humans and transmitting, via a loudspeaker, the acoustic signals into the atmosphere at the first acoustic data communications device;

receiving, via a microphone, acoustic signals from the atmosphere and converting the received acoustic signals into corresponding electrical signals at a second acoustic data communications device;

despreading the power spectrum of the received signals at the second acoustic data communications device;

regenerating the message data transmitted by the first acoustic data communications device from the despread signals generated by the despreading step at the second acoustic data communications device;

processing the regenerated message data using a processor at the second acoustic communications device and outputting a control signal in dependence upon the regenerated message data; and outputting a human discernable response at the second acoustic data communications device in dependence upon the control signal.

30. A method according to claim 29, wherein said outputting step comprises the step of outputting a visible response in dependence upon the control signal.

31. A method according to claim 29, wherein said outputting step outputs an audible response in dependence upon the control signal.

* * * * *